(12) United States Patent
Lappi et al.

(10) Patent No.: US 10,831,657 B2
(45) Date of Patent: Nov. 10, 2020

(54) DEBUG DATA RECOVERY AFTER PLI EVENT

(71) Applicant: Western Digital Technologies, Inc., San Jose, CA (US)

(72) Inventors: Cory Lappi, Rochester, MN (US); William Jared Walker, Rochester, MN (US); Xin Chen, Rochester, MN (US)

(73) Assignee: WESTERN DIGITAL TECHNOLOGIES, Inc., San Jose, CA (US)

( * ) Notice: Subject to any disclaimer, the term of this patent is extended or adjusted under 35 U.S.C. 154(b) by 185 days.

(21) Appl. No.: 16/049,767

(22) Filed: Jul. 30, 2018

(65) Prior Publication Data

US 2019/0087331 A1 Mar. 21, 2019

Related U.S. Application Data

(60) Provisional application No. 62/561,624, filed on Sep. 21, 2017.

(51) Int. Cl.
*G06F 11/07* (2006.01)
*G06F 12/0804* (2016.01)

(52) U.S. Cl.
CPC ...... *G06F 12/0804* (2013.01); *G06F 11/0727* (2013.01); *G06F 11/0751* (2013.01); *G06F 11/0766* (2013.01); *G06F 11/0778* (2013.01); *G06F 2212/1032* (2013.01)

(58) Field of Classification Search
CPC .............................. G06F 11/3058; G06F 1/30

USPC ..................................................... 714/14, 45
See application file for complete search history.

(56) References Cited

U.S. PATENT DOCUMENTS

| 9,570,159 | B1* | 2/2017 | Wakchaure | G11C 11/5628 |
|---|---|---|---|---|
| 10,147,501 | B1* | 12/2018 | Ebsen | G11C 29/789 |
| 10,346,072 | B1* | 7/2019 | Peterson | G06F 1/263 |
| 2013/0254457 | A1* | 9/2013 | Mukker | G06F 11/1441 711/103 |
| 2014/0258755 | A1* | 9/2014 | Stenfort | G06F 1/30 713/323 |
| 2016/0180953 | A1* | 6/2016 | Darragh | G06F 3/0653 365/185.11 |
| 2017/0024266 | A1* | 1/2017 | Iwai | G06F 11/3656 |
| 2017/0052791 | A1* | 2/2017 | Jenne | G06F 9/4403 |
| 2018/0032390 | A1* | 2/2018 | Rahmanian | G06F 11/0754 |

(Continued)

*Primary Examiner* — Chae M Ko
(74) *Attorney, Agent, or Firm* — Patterson & Sheridan, LLP; Steven H. Versteeg

(57) ABSTRACT

The present disclosure generally relates to a storage device sensing critical failure or PLI events and writing the debug data to a memory device so that when boot-up occurs, at least some debug data is available. A dedicated hardware unit detects when one or more critical failure conditions occur by monitoring the one or more critical failure conditions. The critical failure conditions being detected or sensed triggers the dedicated hardware unit to automatically write debug data stored in a volatile memory device to a non-volatile memory device. The debug data stored in the non-volatile memory device provides a critical failure or PLI trace to determine what occurred leading up to and during a critical failure event. By writing the debug data to the non-volatile memory device, the critical failure trace may be accessed and analyzed after the device powers down or fails.

30 Claims, 3 Drawing Sheets

(56) References Cited

U.S. PATENT DOCUMENTS

2018/0285198 A1* 10/2018 Dantkale ............... G06F 12/128
2019/0004947 A1* 1/2019 Trika .................... G06F 3/0619

* cited by examiner

DEBUG DATA RECOVERY AFTER PLI EVENT

CROSS-REFERENCE TO RELATED APPLICATIONS

This application claims benefit of U.S. Provisional Patent Application Ser. No. 62/561,624, filed Sep. 21, 2017, which is herein incorporated by reference.

BACKGROUND OF THE DISCLOSURE

Field of the Disclosure

Embodiments of the present disclosure generally relate to a storage device and a method of operating the storage device.

Description of the Related Art

Debugging information is typically stored during power loss imminent (PLI) conditions in storage devices. The debugging information is best saved to readily available memory such as NOR, rather than memory that is difficult to access after a PLI event, such as NAND. Additionally, the NAND prioritizes host data during PLI events to mitigate data loss. Saving the debugging information during PLI conditions is expensive because the PLI capacitor power of the storage device is limited. Moreover, there is a limited amount of time in a PLI event and a limited amount of power. As such, only the bare minimum of data is saved during PLI events.

During a PLI event, saving data to the NOR is generally not favored since saving to the NOR is slow and expensive. The main processor saving debugging information to the NOR during a PLI event expends a lot of PLI capacitor energy, which results in less data being saved. As such, during a PLI or an emergency power off (EPO) event, a lot of data is left outstanding in volatile storage. When power is lost and the PLI capacitor is drained, that additional debug data is also lost. Debugging in these conditions is quite difficult, particularly debugging issues which occurred during the time of PLI processing.

Therefore, there is a need in the art to save as much debugging data as possible during a PLI event.

SUMMARY OF THE DISCLOSURE

The present disclosure generally relates to a storage device sensing critical failure or PLI events and writing the debug data to a memory device so that when boot-up occurs, at least some debug data is available. A dedicated hardware unit detects when one or more critical failure conditions occur by monitoring the one or more critical failure conditions. The critical failure conditions being detected or sensed triggers the dedicated hardware unit to automatically write debug data stored in a volatile memory device to a non-volatile memory device. The debug data stored in the non-volatile memory device provides a critical failure or PLI trace to determine what occurred leading up to and during a critical failure event. By writing the debug data to the non-volatile memory device, the critical failure trace may be accessed and analyzed after the device powers down or fails.

In one embodiment, a data storage device comprises a controller, one or more volatile memory devices coupled to the controller, one or more non-volatile memory devices coupled to the controller, and a power loss imminent circuit coupled to the controller. The data storage device further comprises a dedicated hardware unit coupled to the power loss imminent circuit, the controller, the one or more non-volatile memory devices, and the one or more volatile memory devices. The dedicated hardware unit is configured to detect one or more power loss imminent conditions from the power loss imminent circuit, and write data stored in the one or more volatile memory devices to the one or more non-volatile memory devices when one or more of the power loss imminent conditions are detected.

In another embodiment, a data storage device comprises a controller comprising one or more processors and a power supply coupled to the controller. The power supply comprising one or more capacitors. The data storage device further comprises one or more memory devices coupled to the controller. The data storage device further comprises a dedicated hardware unit coupled to the controller and the one or more memory devices. The dedicated hardware unit is configured to monitor a charge level of the one or more capacitors to detect when a capacitor charge level reaches a predetermined threshold, and write debug data to the one or more memory devices when the capacitor charge level is detected to reach the predetermined threshold.

In one embodiment, a method of operating a data storage device comprises storing data in a volatile memory device, monitoring one or more triggering critical failure conditions, and detecting when one or more of the triggering critical failure conditions occur. A dedicated hardware unit of the data storage device then writes the data from the volatile memory device to a pre-erased memory block in a non-volatile memory device when one or more of the triggering critical failure conditions occur.

In another embodiment, a method of operating a data storage device comprises storing debug data in a debug buffer of a volatile memory device. The debug buffer continuously stores and updates the debug data. A dedicated hardware unit of the data storage device detects one or more power loss imminent conditions, and writes the debug data from the debug buffer to a non-volatile memory device when one or more of the power loss imminent conditions are detected. The method further comprises detecting a charge on a capacitor of the data storage device reaching a predetermined threshold, and writing any remaining debug data from the debug buffer to the non-volatile memory device when the charge on the capacitor is detected to reach the predetermined threshold.

In yet another embodiment, a data storage device comprises a controller, a plurality of memory devices coupled to the controller, means for detecting one or more triggering critical failure conditions, and means for automatically saving debug data when one or more of the triggering critical failure conditions are detected.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure generally relates to a storage device sensing critical failure or PLI events and writing the debug data to a memory device so that when boot-up occurs, at least some debug data is available. A dedicated hardware unit detects when one or more critical failure conditions occur by monitoring the one or more critical failure conditions. The critical failure conditions being detected or sensed triggers the dedicated hardware unit to automatically write debug data stored in a volatile memory device to a non-volatile memory device. The debug data stored in the non-volatile memory device provides a critical failure or PLI trace to determine what occurred leading up to and during a critical failure event. By writing the debug data to the non-volatile memory device, the critical failure trace may be accessed and analyzed after the device powers down or fails.

Figure 1:
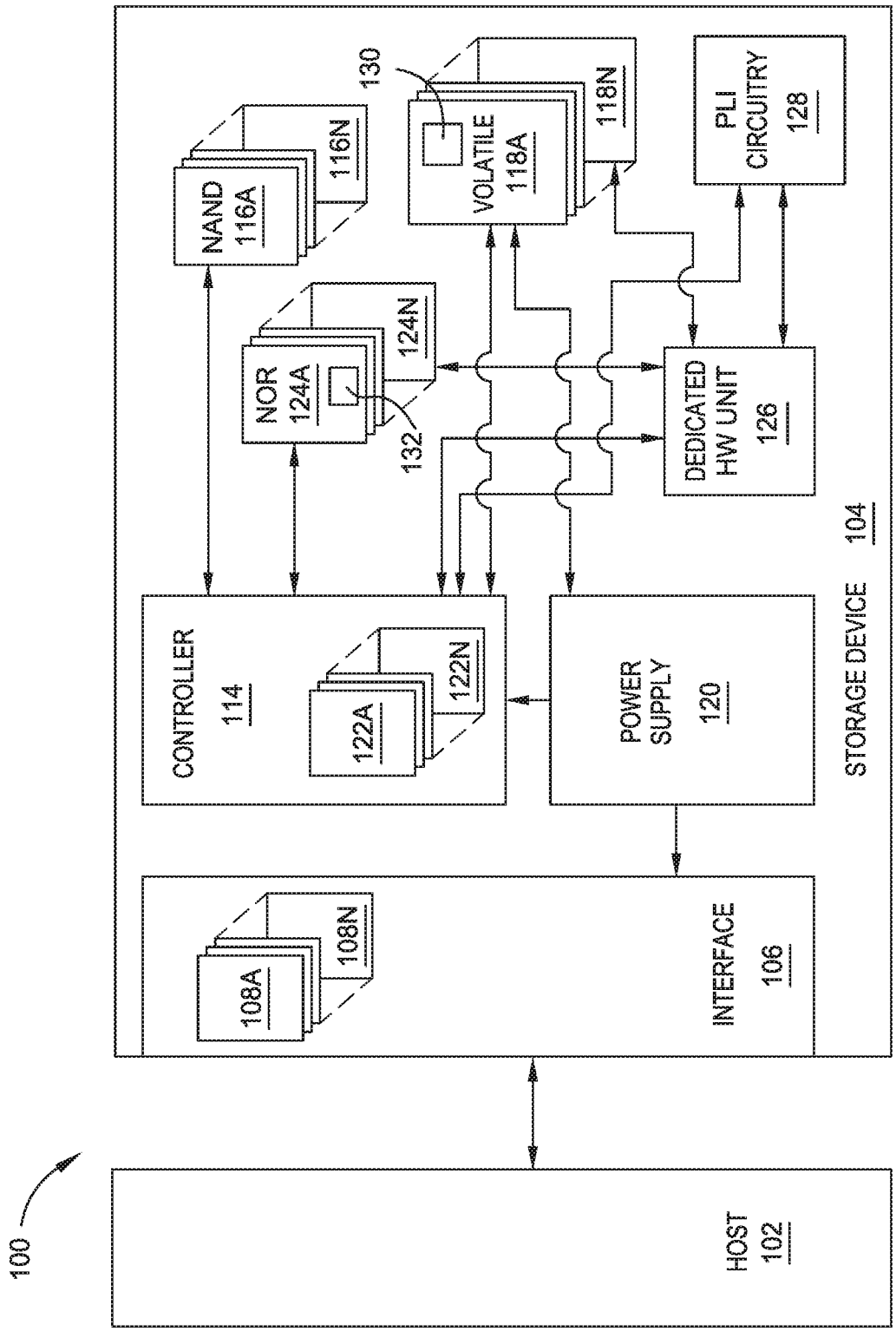
FIG. 1 is a schematic illustration of a data storage system, according to one embodiment.

FIG. 1 is a schematic illustration of data storage system 100 according to one embodiment. The data storage system 100 includes a host device 102 and a storage device 104. The host device 102 is coupled to the storage device 104 both physically as well as electronically through an interface 106 that contains one or more phys 108A-108N.

The storage device 104 includes a controller 114 that is coupled to and communicates with the interface 106. A power supply 120 is coupled to the interface 106 and the controller 114. The controller 114 includes one or more processors 122A-122N. The controller 114 is coupled to one or more fast or quick non-volatile memory devices 116A-116N, one or more volatile memory devices 118A-118N, and one or more slow non-volatile memory devices 124A-124N. An example of a slow non-volatile memory device 124A-124N is a NOR memory device and an example of a fast or quick non-volatile memory device 116A-116N is a NAND memory device.

In some examples, the storage device 104 may include additional components not shown in FIG. 1 for sake of clarity. For example, the storage device 104 may include a printed board (PB) to which components of the storage device 104 are mechanically attached and which includes electrically conductive traces that electrically interconnect components of storage device 104, or the like. In some examples, the physical dimensions and connector configurations of the storage device 104 may conform to one or more standard form factors. Some example standard form factors include, but are not limited to, 3.5" hard disk drive (HDD), 2.5" HDD, 1.8" HDD, peripheral component interconnect (PCI), PCI-extended (PCI-X), PCI Express (PCIe) (e.g., PCIe x1, x4, x8, x16, PCIe Mini Card, MiniPCI, etc.). In some examples, storage device 104 may be directly coupled (e.g., directly soldered) to a motherboard of the host device 102.

The host device 102 may comprise any of a wide range of devices, including computer servers, network attached storage (NAS) units, desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, and the like.

The host device 102 may communicate with storage device 104 via the interface 106. The interface 106 may operate in accordance with any suitable protocol. For example, the interface 106 may operate in accordance with one or more of the following protocols: advanced technology attachment (ATA) (e.g., serial-ATA (SATA) and parallel-ATA (PATA)), Fibre Channel, small computer system interface (SCSI), serially attached SCSI (SAS), peripheral component interconnect (PCI), PCI-express, or Non-Volatile Memory Express (NVMe). The electrical connection of the interface 106 (e.g., the data bus, the control bus, or both) is electrically connected to the controller 114, providing electrical connection between the host device 102 and the controller 114, allowing data to be exchanged between host device the 102 and the controller 114. In some examples, the electrical connection of the interface 106 may also permit the storage device 104 to receive power from the host device 102. For example, as illustrated in FIG. 1, the power supply 120 may receive power from host device the 102 via the interface 106.

The storage device 104 includes the power supply 120, which may provide power to one or more components of the storage device 104. When operating in a standard mode, the power supply 120 may provide power to the one or more components using power provided by an external device, such as the host device 102. For instance, the power supply 120 may provide power to the one or more components using power received from the host device 102 via the interface 106. In some examples, the power supply 120 may include one or more power storage components configured to provide power to the one or more components when operating in a shutdown mode, such as where power ceases to be received from the external device. In this way, the power supply 120 may function as an onboard backup power source. Some examples of the one or more power storage components include, but are not limited to, capacitors, super capacitors, batteries, and the like. In at least one implementation, the power supply 120 comprises a PLI capacitor. In some examples, the amount of power that may be stored by the one or more power storage components may be a function of the cost and/or the size (e.g., area/volume) of the one or more power storage components. In other words, as the amount of power stored by the one or more power storage components increases, the cost and/or the size of the one or more power storage components also increases.

The storage device 104 includes one or more volatile memory devices 118A-118N, which may be used by the controller 114 to temporarily store information. In some examples, the controller 114 may use the one or more volatile memory devices 118A-118N as a cache. For instance, the controller 114 may store cached information in the one or more volatile memory devices 118A-118N until the cached information is written to the one or more non-volatile memory devices 116A-116N. The one or more volatile memory devices 118A-118N may consume power received from the power supply 120 to maintain the data stored in the one or more volatile memory devices 118A-118N. Examples of volatile memory include, but are not limited to, random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, and the like)).

The storage device 104 includes the controller 114, which may manage one or more operations of the storage device 104. For instance, the controller 114 may manage the reading of data from and/or the writing of data to one or more non-volatile memory devices 116A-116N or one or more volatile memory devices 118A-118N. In some examples, the controller 114 may manage the reading of data from and/or the writing of data to the one or more non-volatile memory devices 116A-116N or one or more volatile memory devices 118A-118N by exchanging signals with the one or more non-volatile memory devices 116A-116N or the one or more volatile memory devices 118A-118N. As discussed above, the controller 114 may exchange signals with the one or more non-volatile memory devices 116A-116N or the one or more volatile memory devices 118A-118N in accordance with a communication protocol.

The controller 114 includes one or more processors 122A-122N. The processors 122A-122N may be configured to execute tasks. The tasks may be of different types, and, in some examples, each respective type of task may be stored in or associated with a respective task queue while waiting for execution by the processor 122A-122N. The different types of tasks may include, for example, front end tasks, which may include receiving and interpreting instructions received from the host device 102. Other types of tasks including caching; back-end tasks, which may include reading data from or writing data to the non-volatile memory devices 116A-116N; housing-keeping, which may include garbage collection, wear leveling, TRIM, or the like; and system tasks. In some examples, the processor 122A-122N may be referred to as a computer unit, a processing unit, a core, or a central processing unit (CPU).

As will be discussed in greater detail below, a dedicated hardware unit 126 is present to perform write operations to the one or more non-volatile memory devices, such as the one or more NOR memory devices 124A-124N. The dedicated hardware unit 126 is a separate and distinct hardware piece located in the storage device 104 that is dedicated for use in PLI or critical failure events. The dedicated hardware unit 126 is coupled to PLI circuitry 128 to automatically sense critical failure or PLI conditions. The dedicated hardware unit 126 is configured by the firmware to use a specified buffer 130 that contains the debug data to write to the one or more NOR non-volatile memory devices 124A-124N. At least one NOR memory device 124A of the one or more NOR non-volatile memory devices 124A-124N comprises a pre-erased NOR memory block 132 that is dedicated to remain available until the dedicated hardware unit 126 detects a PLI condition.

The buffer 130 is located in a volatile memory device 118A of the one or more volatile memory devices 118A-118N. The buffer 130 is a pre-allocated section of the volatile memory device 118A that is coupled to a dedicated hardware unit 126. In at least one implementation, the buffer 130 is located in a DRAM device. The buffer 130 is sized according to the PLI power capacitor available for such operations and is initialized to a known pattern indicating that there is no data to write out. Debug data may be continuously stored to the buffer 130 while the storage device 104 operates. The debug data may comprise information regarding what steps the device took or what events occurred leading up to and during a PLI scenario or critical failure scenario so that the events may be traced.

The dedicated hardware unit 126, upon sensing or detecting critical failure or PLI conditions in the PLI circuitry 128, checks the buffer 130 and writes out any records or data found in the buffer 130 to the pre-erased NOR memory block 132. The dedicated hardware unit 126 then continues monitoring the buffer 130 where the dedicated hardware unit 126 last read from, polling for more records as the records become available while the firmware continues to finish PLI processing, dropping records to save out. The dedicated hardware unit 126 also monitors the capacitor charge level in the power supply 120, and when the capacitor charge level drops to a certain level, the dedicated hardware unit 126 will stop monitoring the buffer 130, write a final record to the pre-erased NOR memory block 132 and ensure the pre-erased NOR memory block 132 is quiesced and ready for power loss.

Stated another way, the dedicated hardware unit 126 anticipates PLI events based upon certain, predefined triggers. The dedicated hardware unit 126 functions to save as much data as possible prior to the complete loss of power. Once a PLI event occurs, there is a finite amount of power left in the storage device 104 until complete shutdown. That remaining power is allocated to certain tasks of which the dedicated hardware unit 126 can have some power. The firmware points the dedicated hardware unit 126 to the buffer 130 to indicate what was written down in the pre-erased NOR memory block 132 during the PLI event. While all possible data may not be written during the PLI or critical failure event, at least some data can be saved to help trace what occurred during the PLI or critical failure event.

Using the dedicated hardware unit 126 may also permit the main processor to shut down earlier (thus saving power). During a PLI event, the dedicated hardware unit 126 looks for something that doesn't match known patterns and writes all of the non-matching information to the pre-erased NOR memory block 132. In a most basic sense, the dedicated hardware unit 126 watches and monitors the buffer 130 and writes information to the pre-erased NOR memory block 132 in a PLI event. If all the data can be written in a PLI event, the dedicated hardware unit 126 can append a completion signal to the data to indicate that everything was written. Using the dedicated hardware unit 126 allows the storage device 104 to minimize the amount of energy required while under duress. Thus, the NAND memory devices 116A-116N can prioritize saving host data, allowing the NAND memory devices 116A-116N to save as much host data to a write cache during a PLI event to minimize the amount of host data lost.

Utilizing a dedicated hardware unit to sense PLI conditions and to write debug data to the NOR memory devices allows the main processor to power down as the PLI processing completes. Additionally, the processor does not have to perform the writes to the NOR memory devices, which saves PLI capacitor energy for other processors still working on PLI processing and reduces the amount of time needed to save data under a PLI event. The efficiency can be leveraged to reduce the size of the PLI capacitor or to extend the amount of data saved during PLI conditions to the NOR memory devices.

Figure 2:
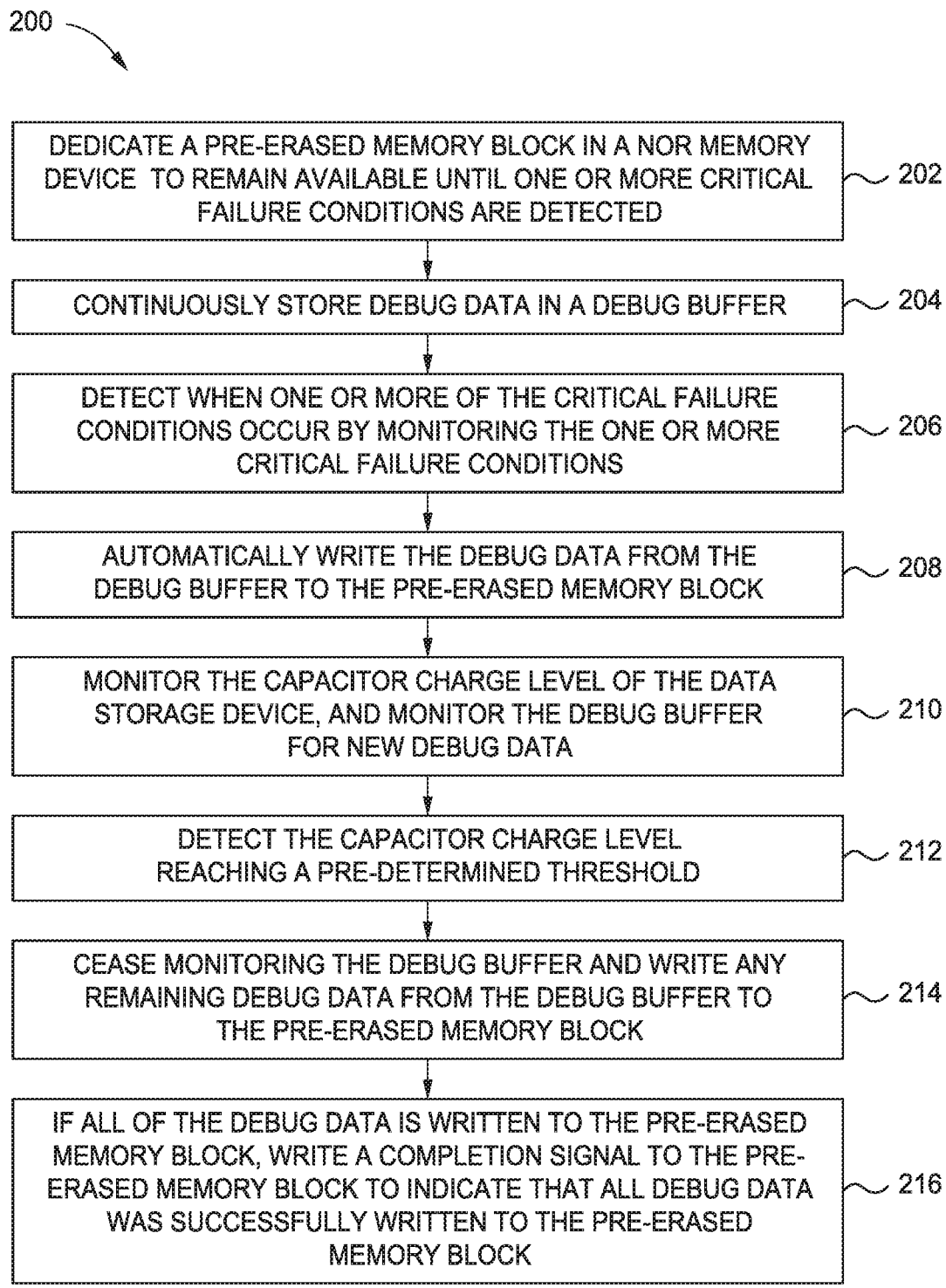
FIG. 2 is a schematic illustration of a method of saving debug data during a PLI event of a storage device, according to one embodiment.

FIG. 2 is a schematic illustration of a method 200 for saving debug data during a PLI event of a storage device, according to one embodiment. Method 200 may be executed by the data storage system 100.

In operation 202, a pre-erased memory block in a non-volatile memory device, such as the pre-erased NOR memory block 132 of FIG. 1, is dedicated to remain available until one or more critical failure conditions are detected or sensed. In at least one implementation, the pre-erased block is erased and dedicated when the storage device is powered on or rebooted.

As the storage device operates, data including debug information (i.e., debug data) is stored in a specified debug buffer in operation 204. The debug buffer, such as the debug buffer 130 of FIG. 1, is located in a volatile memory device. The debug buffer is a pre-allocated section of the volatile memory device that is coupled to a dedicated hardware unit, such as the dedicated hardware unit 126 of FIG. 1. In at least one implementation, the debug buffer is located in a DRAM device. The debug buffer is sized according to the PLI capacitor power available for PLI operations. Debug data may be continuously stored to the debug buffer while the storage device operates. The debug data provides a PLI trace, and may comprise information regarding what steps the device took or what events occurred leading up to and during a PLI scenario or critical failure scenario.

In operation 206, the dedicated hardware unit detects when one or more of the critical failure conditions occur by monitoring the one or more critical failure conditions. The dedicated hardware unit is configured to automatically sense or detect the critical failure conditions from PLI circuitry, such as the PLI circuitry 128 of FIG. 1. The dedicated hardware unit may further monitor voltage conditions of the device to determine whether the voltage conditions exceed a predetermined range, and monitor temperature conditions of the device to determine whether the temperature conditions exceed a predetermined range.

The one or more critical failure conditions include PLI conditions, such as an EPO or when an energy level on the capacitor drains to a certain predetermined level. The one or more critical failure conditions may further include, but are not limited to, a temperature of the device becoming too hot or too cold, a voltage of the device becoming too high or too low, and a quick cut of power to the device (i.e., a brown out of the device). In one embodiment, the dedicated hardware unit detects when an assert procedure is being executed, such as by a manufacturer of the device, and determines such an event to be a critical failure condition.

In operation 208, once one or more of the critical failure conditions occur, the dedicated hardware unit automatically writes the debug data from the debug buffer to the pre-erased memory block that was dedicated in operation 202. One or more of the critical failure conditions occurring triggers the dedicated hardware unit to start transferring the debug data from the debug buffer to the pre-erased memory block in the NOR memory device. In one embodiment, the dedicated hardware unit receives a command from a controller or a host to write the debug data from the debug buffer to the pre-erased memory block. The dedicated hardware unit writes as much debug data to the pre-erased memory block as possible, but may not be able to write all of the debug data stored in the debug buffer to the pre-erased memory block before the device completely shuts down or before the capacitor charge level is fully depleted.

If the device shuts down or the capacitor charge level is fully depleted before all the debug data can be written to the pre-erased memory block, the method 200 ends. The debug data that was able to be transferred and stored to the pre-erased memory block can then be accessed to trace the events leading to and during the critical failure scenario.

If the dedicated hardware unit is able to write all of the debug data currently stored in the debug buffer, the method 200 proceeds to operation 210. In operation 210, the charge on the PLI capacitor is monitored and the debug buffer is monitored for any new debug data being written to the debug buffer. In one embodiment, the dedicated hardware unit continues to write the new debug data to the pre-erased memory block as the new debug data becomes available.

In operation 212, the dedicated hardware unit detects when the capacitor charge level reaches a predetermined threshold or level. The capacitor charge level reaching the predetermined threshold alerts the dedicated hardware unit that the capacitor charge level is nearing depletion. In operation 214, when the charge on the capacitor reaches the predetermined level, the dedicated hardware unit ceases monitoring the debug buffer for new debug data and writes any remaining debug data currently stored in the debug buffer to the pre-erased memory block. If all the debug data was not able to be written to the pre-erased memory block due to the capacitor charge level fully depleting, the method 200 ends. The debug data that was able to be transferred and stored to the pre-erased memory block can then be accessed to trace the events leading to and during the critical failure scenario.

If all the debug data was able to be written to the pre-erased memory block before the capacitor depletes, the method 200 proceeds to operation 216. In operation 216, the dedicated hardware unit writes a completion signal to the pre-erased memory block to indicate that all debug data was successfully written to the pre-erased memory block, and a full PLI trace can be performed.

During the critical failure or PLI event, one or more processors may power down after completing a PLI process. The PLI process may comprise writing data from a write cache to a NAND memory device. Since the dedicated hardware unit writes the debug data to the NOR upon detecting a PLI condition, the one or more processors need not write data to the NOR, and can instead prioritize the host data stored in the NAND.

Figure 3:
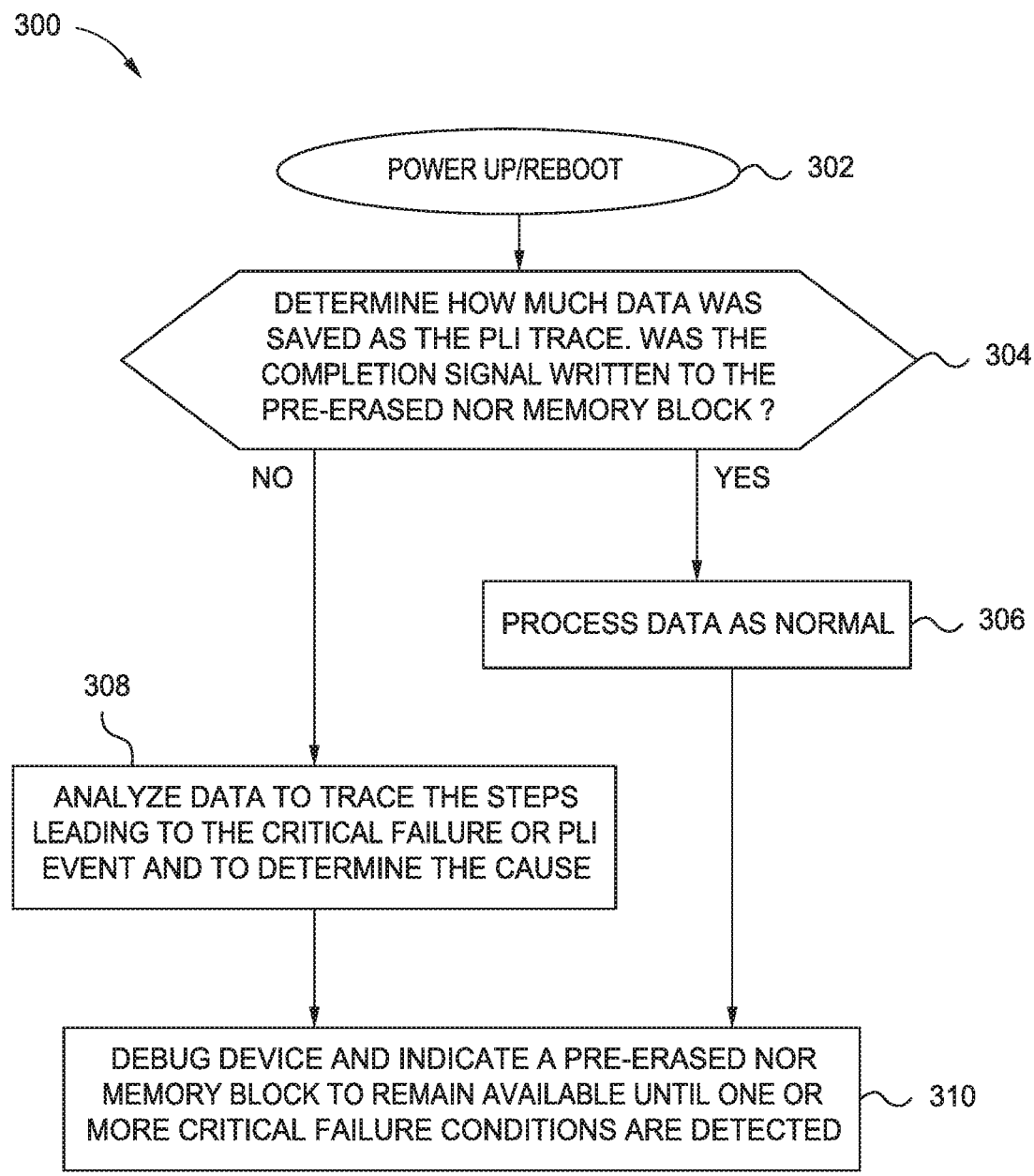
FIG. 3 illustrates a method of a data storage device processing the debug data stored following a critical failure or PLI event, according to one embodiment.

FIG. 3 illustrates a method 300 of a data storage device processing the data stored in a non-volatile memory device, such as a pre-erased NOR memory block, following a critical failure or PLI event, according to one embodiment. Method 300 may be executed by the data storage system 100, and may further be used in combination with method 200. For example, method 300 may be implemented by a device following operations 208, 212, or 216 of method 200.

Method 300 begins at operation 302, when the device is powered up or rebooted after a critical failure or PLI event has occurred. In operation 304, the device determines how much debug information and data was saved to the pre-erased NOR memory block as the PLI trace, and determines whether a completion signal was written to the pre-erased NOR memory block with the data.

If the completion signal was written to the pre-erased NOR memory block with the data, the method 300 proceeds to operation 306. In operation 306, the device processes the data as normal. Since the full amount of data and the completion signal were written to the pre-erased NOR memory block, the full PLI trace can be processed. If the completion signal was not written to the pre-erased NOR memory block with the data, the method 300 proceeds to operation 308.

In operation 308, the device analyzes the data to trace the steps leading to the critical failure or PLI event and to determine the cause. For example, the device may have been expected to have saved all or a majority of the data, but instead only a small portion of data was saved. The small portion of data saved may be analyzed to determine what occurred leading up to and during the critical failure or PLI event, and may provide additional details as to why the expected amount of data was not saved.

Following both operation 306 and operation 308, the method 300 proceeds to operation 310. In operation 310, the device is debugged based on the PLI trace, and a new a pre-erased NOR memory block is dedicated to remain available until one or more critical failure conditions are detected.

By using a dedicated hardware unit to watch, and thus anticipate PLI events, debug data can be saved to a NOR memory device, and debugging devices after a PLI event is much more likely to be accomplished. Utilizing a dedicated hardware unit to sense PLI conditions and to write debug data to the NOR allows the processors to power down as the PLI processing completes. Additionally, the processors do not have to perform the writes to the NOR memory devices, which saves PLI capacitor energy for other processors still working on PLI processing and reduces the amount of time needed to save data under a PLI event. The efficiency can be leveraged to reduce the size of the PLI capacitor or to extend the amount of data saved during PLI conditions to the NOR memory devices.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in an article of manufacture including a computer-readable storage medium encoded with instructions. Instructions embedded or encoded in an article of manufacture including a computer-readable storage medium encoded, may cause one or more programmable processors, or other processors, to implement one or more of the techniques described herein, such as when instructions included or encoded in the computer-readable storage medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may include one or more computer-readable storage media.

In some examples, a computer-readable storage medium may include a non-transitory medium. The term "non-transitory" may indicate that the storage medium is not embodied in a carrier wave or a propagated signal. In certain examples, a non-transitory storage medium may store data that can, over time, change (e.g., in RAM or cache).

In one embodiment, a data storage device comprises a controller, one or more volatile memory devices coupled to the controller, one or more non-volatile memory devices coupled to the controller, and a power loss imminent circuit coupled to the controller. The data storage device further comprises a dedicated hardware unit coupled to the power loss imminent circuit, the controller, the one or more non-volatile memory devices, and the one or more volatile memory devices. The dedicated hardware unit is configured to detect one or more power loss imminent conditions from the power loss imminent circuit, and write data stored in the one or more volatile memory devices to the one or more non-volatile memory devices when one or more of the power loss imminent conditions are detected.

The one or more non-volatile memory devices may comprise one or more NAND memory devices and one or more NOR memory devices. The data may be written to the one or more NOR memory devices when one or more of the power loss imminent conditions are detected. The one or more power loss imminent conditions may comprise a temperature of the data storage device exceeding a predetermined operating temperature range. The one or more power loss imminent conditions may comprise a voltage of the data storage device exceeding a predetermined operating voltage range. A first volatile memory device of the one or more volatile memory devices may comprise a debug buffer for storing the data. A first non-volatile memory device of the one or more non-volatile memory devices may comprise a dedicated pre-erased memory block. The dedicated hardware unit may be further configured to write the data from the debug buffer of the first volatile memory device to the dedicated pre-erased memory block of the first non-volatile memory device when the power loss imminent circuit detects one or more power loss imminent conditions.

In another embodiment, a data storage device comprises a controller comprising one or more processors and a power supply coupled to the controller. The power supply comprising one or more capacitors. The data storage device further comprises one or more memory devices coupled to the controller. The data storage device further comprises a dedicated hardware unit coupled to the controller and the one or more memory devices. The dedicated hardware unit is configured to monitor a charge level of the one or more capacitors to detect when a capacitor charge level reaches a predetermined threshold, and write debug data to the one or more memory devices when the capacitor charge level is detected to reach the predetermined threshold.

The data storage device may further comprise a power loss imminent circuit coupled to the dedicated hardware unit. The dedicated hardware unit may be further configured to automatically detect one or more critical failure conditions from the power loss imminent circuit. The one or more memory devices may comprise a NOR memory device and a volatile memory device. The debug data may be written to the NOR memory device. The dedicated hardware unit may be further configured to write a completion signal to the NOR memory device when all of the debug data is written to the NOR memory device. The dedicated hardware unit may be further configured to monitor voltage conditions of the data storage device to determine whether the voltage conditions exceed a predetermined range, and monitor temperature conditions of the data storage device to determine whether the temperature conditions exceed a predetermined range. The dedicated hardware unit may be further configured to write debug data to the one or more memory devices when the voltage conditions exceed the predetermined range, and write debug data to the one or more memory devices when the temperature conditions exceed the predetermined range.

In one embodiment, a method of operating a data storage device comprises storing data in a volatile memory device, monitoring one or more triggering critical failure conditions, and detecting when one or more of the triggering critical failure conditions occur. A dedicated hardware unit of the data storage device then writes the data from the volatile memory device to a pre-erased memory block in a non-volatile memory device when one or more of the triggering critical failure conditions occur.

The method may further comprise powering down one or more processors when a power loss imminent process completes. The power loss imminent process may comprise writing data from write cache to a NAND memory device. The one or more triggering critical failure conditions may comprise a temperature of the data storage device exceeding a predetermined temperature range. The one or more triggering critical failure conditions may comprise a voltage of the data storage device exceeding a predetermined range. The one or more triggering critical failure conditions may comprise a power loss to the data storage device. The non-volatile memory device may be a NOR memory device. The data from the volatile memory device may be written to a dedicated pre-erased memory block of the NOR memory device.

In another embodiment, a method of operating a data storage device comprises storing debug data in a debug buffer of a volatile memory device. The debug buffer continuously stores and updates the debug data. A dedicated hardware unit of the data storage device detects one or more power loss imminent conditions, and writes the debug data from the debug buffer to a non-volatile memory device when one or more of the power loss imminent conditions are detected. The method further comprises detecting a charge on a capacitor of the data storage device reaching a predetermined threshold, and writing any remaining debug data from the debug buffer to the non-volatile memory device when the charge on the capacitor is detected to reach the predetermined threshold.

The power loss imminent conditions may comprise an assert procedure being executed to the data storage device. The method may further comprise monitoring, by the dedicated hardware unit, the debug buffer for new debug data stored. The method may further comprise dedicating a memory block in the non-volatile memory device to remain available until one or more power loss imminent conditions are detected prior to storing the debug data in the debug buffer of the volatile memory device.

In yet another embodiment, a data storage device comprises a controller, a plurality of memory devices coupled to the controller, means for detecting one or more triggering critical failure conditions, and means for automatically saving debug data when one or more of the triggering critical failure conditions are detected.

The plurality of memory devices may comprise one or more NOR memory devices and one or more volatile memory devices. The means for automatically saving debug data when one or more of the triggering critical failure conditions are detected may comprise writing debug data to the one or more NOR memory devices. The one or more triggering critical failure conditions may comprise a power loss to the data storage device.

While the foregoing is directed to embodiments of the present disclosure, other and further embodiments of the disclosure may be devised without departing from the basic scope thereof, and the scope thereof is determined by the claims that follow.

What is claimed is:

1. A data storage device, comprising:
a controller;
one or more volatile memory devices coupled to the controller;
one or more non-volatile memory devices coupled to the controller;
a power loss imminent circuit coupled to the controller; and
a dedicated hardware unit coupled to the power loss imminent circuit, the controller, the one or more non-volatile memory devices, and the one or more volatile memory devices, wherein the dedicated hardware unit is configured to:
detect one or more power loss imminent conditions from the power loss imminent circuit; and
write data stored in the one or more volatile memory devices to the one or more non-volatile memory devices when one or more of the power loss imminent conditions are detected, wherein the one or more non-volatile memory devices comprise one or more NAND memory devices and one or more NOR memory devices, and wherein the data is written to the one or more NOR memory devices when one or more of the power loss imminent conditions are detected.

2. The data storage device of claim 1, wherein the one or more power loss imminent conditions comprise a temperature of the data storage device exceeding a predetermined operating temperature range.

3. The data storage device of claim 1, wherein the one or more power loss imminent conditions comprise a voltage of the data storage device exceeding a predetermined operating voltage range.

4. The data storage device of claim 1, wherein a first volatile memory device of the one or more volatile memory devices comprises a debug buffer for storing the data.

5. The data storage device of claim 4, wherein a first non-volatile memory device of the one or more non-volatile memory devices comprises a dedicated pre-erased memory block.

6. The data storage device of claim 5, wherein the dedicated hardware unit is further configured to write the data from the debug buffer of the first volatile memory device to the dedicated pre-erased memory block of the first non-volatile memory device when the power loss imminent circuit detects one or more power loss imminent conditions.

7. The data storage device of claim 1, wherein the dedicated hardware unit is further configured to:
write data stored in the one or more volatile memory devices to the one or more non-volatile memory devices when the capacitor charge level is detected to reach the predetermined threshold;
write data stored in the one or more volatile memory devices to the one or more non-volatile memory devices when voltage conditions exceed a predetermined range; and
write data stored in the one or more volatile memory devices to the one or more non-volatile memory devices when temperature conditions exceed a predetermined range.

8. A data storage device, comprising:
a controller comprising one or more processors;
a power supply coupled to the controller, the power supply comprising one or more capacitors;
one or more non-volatile memory devices coupled to the controller, wherein at least one non-volatile memory device comprises a dedicated pre-erased erase block;
one or more volatile memory devices coupled to the controller, wherein at least one volatile memory device comprises a debug buffer for storing debug data; and
a dedicated hardware unit coupled to the controller and the one or more memory devices, wherein the dedicated hardware unit is configured to:
monitor a charge level of the one or more capacitors to detect when a capacitor charge level reaches a predetermined threshold; and
write debug data from the debug buffer of the at least one volatile memory device to the dedicated pre-erased erase block of the at least one non-volatile memory device when the capacitor charge level is detected to reach the predetermined threshold.

9. The data storage device of claim 8, further comprising a power loss imminent circuit coupled to the dedicated hardware unit.

10. The data storage device of claim 9, wherein the dedicated hardware unit is further configured to automatically detect one or more critical failure conditions from the power loss imminent circuit.

11. The data storage device of claim 8, wherein the at least one non-volatile memory device is a NOR memory device, and wherein the debug data is written to the NOR memory device.

12. The data storage device of claim 11, wherein the dedicated hardware unit is further configured to write a completion signal to the NOR memory device when all of the debug data is written to the NOR memory device.

13. The data storage device of claim 8, wherein the dedicated hardware unit is further configured to:
monitor voltage conditions of the data storage device to determine whether the voltage conditions exceed a predetermined range, and
monitor temperature conditions of the data storage device to determine whether the temperature conditions exceed a predetermined range.

14. The data storage device of claim 13, wherein the dedicated hardware unit is further configured to:
write debug data to the at least one non-volatile memory device when the voltage conditions exceed the predetermined range, and
write debug data to the at least one non-volatile memory device when the temperature conditions exceed the predetermined range.

15. The data storage device of claim 8, wherein the at least one non-volatile memory device is a NOR memory device.

16. A method of operating a data storage device, comprising:
storing data in a volatile memory device;
monitoring one or more triggering critical failure conditions;
detecting when one or more of the triggering critical failure conditions occur; and
writing, by a dedicated hardware unit of the data storage device, the data the volatile memory device to a non-volatile memory device when one or more of the triggering critical failure conditions occur, wherein the non-volatile memory device is a NOR memory device, and wherein the data from the volatile memory device is written to a dedicated pre-erased memory block of the NOR memory device.

17. The method of claim 16, further comprising powering down one or more processors when a power loss imminent process completes.

18. The method of claim 17, wherein the power loss imminent process comprises writing data from write cache to a NAND memory device.

19. The method of claim 16, wherein the one or more triggering critical failure conditions comprise a temperature of the data storage device exceeding a predetermined temperature range.

20. The method of claim 16, wherein the one or more triggering critical failure conditions comprise a voltage of the data storage device exceeding a predetermined range.

21. The method of claim 16, wherein the one or more triggering critical failure conditions comprise a power loss to the data storage device.

22. The method of claim 16, wherein the NOR memory device comprises a dedicated pre-erased memory block, and wherein the data from the debug buffer of the volatile memory device is written to the dedicated pre-erased memory block of the NOR memory device.

23. A method of operating a data storage device, comprising:
storing debug data in a debug buffer of a volatile memory device, wherein the debug buffer continuously stores and updates the debug data;
detecting, by a dedicated hardware unit of the data storage device, one or more power loss imminent conditions;
writing, by the dedicated hardware unit, the debug data from the debug buffer to a dedicated pre-erased memory block of a non-volatile memory device when one or more of the power loss imminent conditions are detected, wherein the non-volatile memory device is a NOR memory device;
detecting a charge on a capacitor of the data storage device reaching a predetermined threshold; and
writing any remaining debug data from the debug buffer to the non-volatile memory device when the charge on the capacitor is detected to reach the predetermined threshold.

24. The method of claim 23, wherein the power loss imminent conditions comprise an assert procedure being executed to the data storage device.

25. The method of claim 23, further comprising monitoring, by the dedicated hardware unit, the debug buffer for new debug data stored.

26. The method of claim 23, further comprising writing a completion signal to the dedicated memory block when all of the debug data is written to the non-volatile memory device.

27. The method of claim 23, wherein the remaining debug data from the debug data buffer is written to the dedicated pre-erased memory block when the charge on the capacitor is detected to reach the predetermined threshold.

28. A data storage device, comprising:
a controller;
a plurality of memory devices coupled to the controller;
means for detecting one or more triggering critical failure conditions; and
means for automatically saving debug data when one or more of the triggering critical failure conditions are detected, wherein the means for automatically saving debug data when one or more of the triggering critical failure conditions are detected comprise writing debug data from a debug buffer of at least one volatile memory device of the plurality of memory devices to a dedicated pre-erased memory block of at least one NOR memory device of the plurality of memory devices.

29. The data storage device of claim 28, wherein the plurality of memory devices comprise one or more NOR memory devices and one or more volatile memory devices, and wherein the at least one volatile memory device comprises a debug buffer for storing data.

30. The data storage device of claim 28, wherein the one or more triggering critical failure conditions comprise a power loss to the data storage device.

* * * * *